July 2, 1968   L. MARSHALL   3,390,535
PROPANE-PROPYLENE SEPARATION WITH ACETYLENIC IMPURITY REMOVAL
Filed Sept. 10, 1965

INVENTOR
Louis Marshall
BY *Flynn, Marn
& Jangarathis*
ATTORNEYS

UnitedStates Patent Office 3,390,535
Patented July 2, 1968

3,390,535
PROPANE-PROPYLENE SEPARATION WITH
ACETYLENIC IMPURITY REMOVAL
Louis Marshall, 96 Croyden Ave.,
Great Neck, N.Y. 11023
Filed Sept. 10, 1965, Ser. No. 486,486
10 Claims. (Cl. 62—28)

ABSTRACT OF THE DISCLOSURE

A process for recovering either propane or propylene, free of acetylenic impurities, from a propane-propylene mixture, containing such impurities, wherein the mixture is introduced into a first fractionator to effect separation of propane from propylene. A side stream, containing a substantial portion of the impurities, is withdrawn from the first fractionator and introduced into a second fractionator to recover either a propane or propylene stream, essentially free of the impurities, the stream being recycled to the first fractionator. If propane is the desired product, a propane bottoms is recycled to the first fractionator and propane bottoms is recovered as final product from the first fractionator. If propylene is the desired product, a propylene overhead is recycled to the first fractionator and a propylene overhead is recovered as final product from the first fractionator.

---

Figures 1, 2:
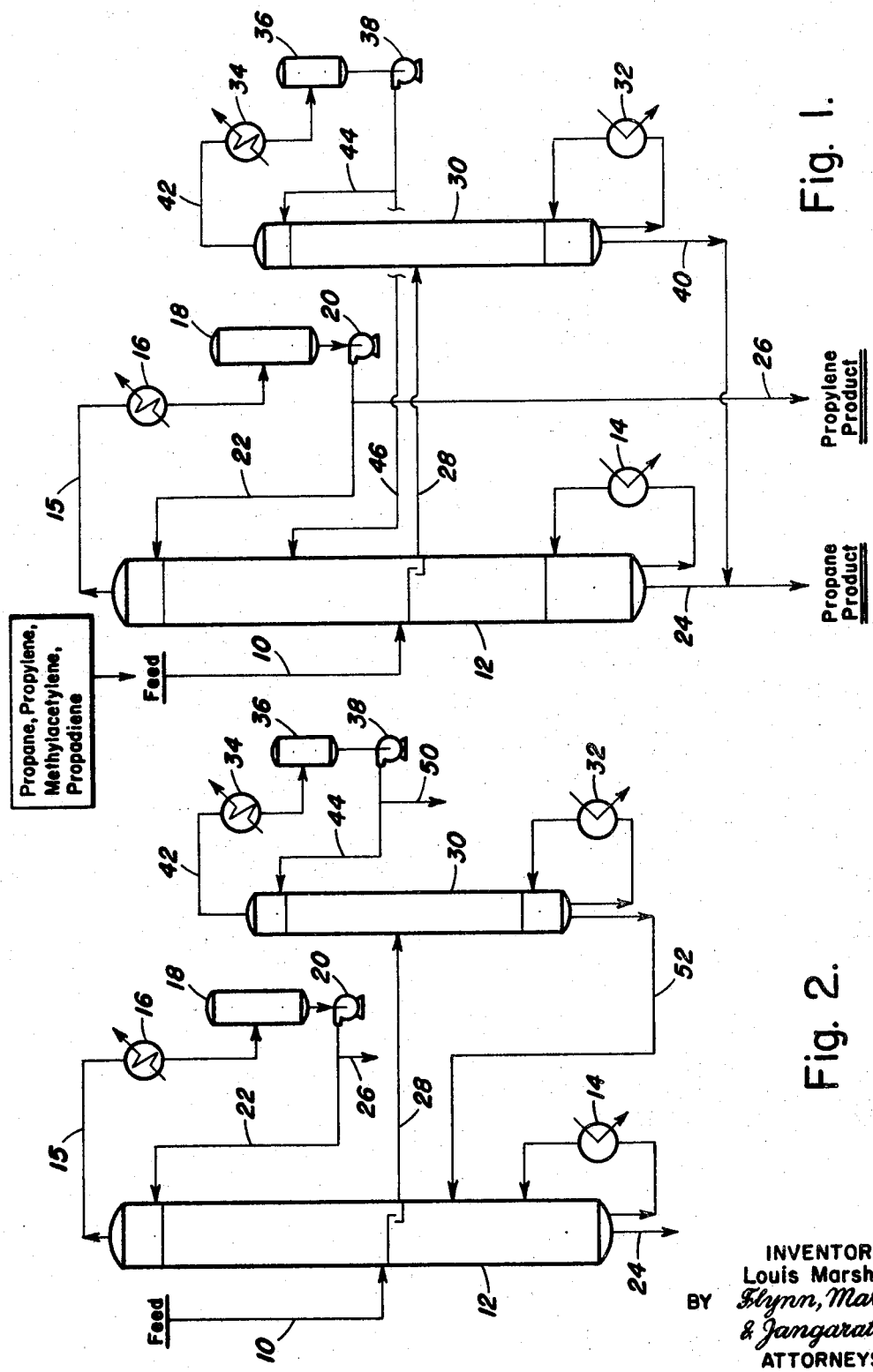

This invention relates in general to the separation of hydrocarbon mixtures and, more particularly, the invention relates to separation of hydrocarbon mixtures having a minor component with a relative volatility whose value is between the relative volatility of a lower boiling light key component and a higher boiling heavier key component. In one embodiment, the invention produces the lighter component in high purity form and in a second embodiment the heavier component is highly pure. A typical example of the invention is the separation of methylacetylene and propadiene from mixtures thereof with propylene and propane obtained by pyrolysis, and the invention will be described with reference thereto, it being understood that the invention is applicable to many similar systems.

In the commercial production of monoolefins, such as ethylene, propylene and other unsaturated compounds, by the pyrolysis of hydrocarbons, such as naphtha feed stocks, it is important that the monoolefin be produced in a high degree of purity. It has been found, however, that the pyrolysis reaction also produces a substantial quantity of acetylenic impurities, such as methylacetylene, the presence of which impairs the usefulness of the monoolefins when subsequently subjected to further treatment. Of particular importance, is the necessity to remove these acetylenic impurities from propylene-propane mixtures when it is desired to subject the propylene to polymerization treatment for the production of industrially valuable plastic materials.

At the present time, the aforementioned purification treatment for the removal of acetylenic impurities is carried out by a variety of processes included among which are catalytic hydrogenation processes and solvent extraction wherein acetone dimethylformamide or butyrolactone are employed as selective solvent extraction agents. Also, selective or preferential polymerization of the acetylenic impurities, without polymerization of the desired olefins, can be done by using normal cracking catalysts in the deactivated or poisoned state as catalysts. Catalyst solutions of cuprous chloride have also been employed for selective polymerization. All of the foregoing processes for the removal of these impurities suffer from the disadvantage of being both complicated, requiring substantial capital investment in processing equipment, and/or investment in suitable reagents and catalysts.

The usual product specification for high purity polymer grade propylene includes a maximum of 10 to 25 p.p.m. on the concentration of methylacetylene and propadiene. When the propylene is produced in an ethylene plant as a byproduct in the thermal cracking of a hydrocarbon such as propane, butane, naphtha or a gas-oil, the methylacetylene and propadiene are produced in amounts which substantially exceed the specification limits. In addition to the above mentioned purification schemes, these impurities are also removed by catalytic hydrogenation of the contaminants from the propylene stream before the final separation of the propylene fraction, or alternatively, by designing the propylene fractionator to produce a propane product containing approximately 50 mol percent propylene, at which level the elimination of methylacetylene and propadiene in the overhead propylene product is assured. As noted above, the catalytic hydrogenation systems require substantial investment for equipment and catalysts. The second named method involves an amount of propylene loss in the propane product.

Where the amount of propane involved is relatively small, as for example when naphtha feeds are being treated, the second method is normally used since the loss of propylene may only be a few percent of the net propylene product. Where the propane stream is relatively large, on the other hand, as with a propane feed, the catalytic hydrogenation route is employed to avoid the large propylene loss which the other method would entail.

It is therefore a general object of the present invention to provide an improved process for the separation of hydrocarbon mixtures, particularly those containing minor amounts of a component of intermediate relative volatility compared to the major components.

A further object of the present invention is to provide an improved process for the elimination of methylacetylene, propadiene and like impurities from olefin streams, wherein the aforementioned deficiencies of prior art processes are eliminated.

Another object of the present invention is to provide an improved process for the purification of monoolefin streams, wherein methylacetylene, propadiene and like impurities are eliminated with the production of a propane product containing a low concentration of propylene, and with little propylene loss.

Still another object of the present invention is the provision of an improved process for the separation of propylene-propane hydrocarbon streams with the elimination of methylacetylene and propadiene therefrom, which process avoids the investment and operating costs of the selective hydrogenation systems commonly employed.

Various other objects and advantages of the present invention will become clear from the following description of two embodiments thereof, and the novel features will be particularly pointed out in connection with the appended claims.

The invention may be described in general terms as follows. Fractionation of a chemical system which has a minor component with a relative volatility whose value is in between the relative volatilities of a lower boiling light key component and a higher boiling heavy key component, will produce concentration gradients in the vapor and liquid streams, such that the minor component concentration is low at the top and bottom ends of the tower and gradually increases to some maximum value in the central portion of the tower. Withdrawal of a small liquid sidestream from a point near the maximum value permits removal of the bulk of the minor component introduced with the feed stream. In accordance with the present invention, a second fractionating tower is used to recover the light key component contained in the small sidestream. In this tower, operating conditions are used to permit most of the minor components to leave in the bottom product while most of the light key goes to the net overhead stream. A small but definite amount of light key must also leave in the bottom product to permit elimination of the minor component. However, since the net bottoms from the second tower is small, the loss of light key in it is not significant. The net overhead stream from the second tower is returned to the first tower for further fractionation in mixture with the net feed to the system.

The invention as described above applies to a system in which the light key component produced overhead is the valuable quantity and must be obtained in high purity. The invention also applies, however, where the heavy key component produced as a bottom product is the valuable item to be obtained at high concentration. In this case, the bottoms from the second fractionating tower are returned to the first tower, and a small but definite amount of heavy key is permitted to leave in the net overhead product stream, taken as a net product from the system.

When propylene and propane are separated by fractionation, the concentration of methylacetylene is low in the top of the fractionation tower and is also low in the bottom stream from the tower, but builds up to a certain maximum value in the region of the feed tray of the tower. While not wishing to be bound by any particular theory of operation, it is believed that this behavior is due to the fact that the relative volatility of methylacetylene is high at low propylene concentrations and decreases as propylene concentration becomes higher. For example, it is known that the volatility of methylacetylene is higher than that of propylene for propylene concentrations below 15 mol percent, and lower than that of propane at propylene concentrations above about 70 mol percent. It is also known that relative volatility of propadiene is less than that of propane except at very low concentrations of propylene.

Since methylacetylene can build up to a high concentration in a tower, it is necessary to limit the amount of this component in a propane-propylene feed mixture when using only a single tower system, so as to avoid interference in the fractionation of propylene from propane and to insure meeting the limiting specification for this contaminant in the propylene product. The limitation in feed concentration of methylacetylene is such that a single tower system alone is not satisfactory for eliminating this component from propylene produced by thermal cracking, unless a moderate to high loss of propylene in the bottom product of propane is accepted. In accordance with the present invention, however, a second tower is employed and offers a method for fractionating propane-propylene streams obtained by thermal cracking at a high recovery of propylene and without a limitation on methylacetylene or propadiene contents of the feed.

In accordance with the invention, the feed mixture, containing propylene, propane, methylacetylene and propadiene, is fed to a propylene fractionating tower which produces a high purity propylene product as overhead and a bottoms product which concentrates the bulk of the net propane product and has a very low propylene concentration, i.e. about 1 mol percent. This fractionating tower has the usual auxiliary equipment including a reboiler, condenser, reflux drum and pump.

As a novel feature of the invention, a side stream is drawn off from this primary tower from a region where the concentration of methylacetylene is high, and this stream is passed to a second fractionator which produces a bottom propane product with a propylene concentration of about 15 mol percent, and which includes 95 percent or more of the methylacetylene and propadiene contained in the feed. The overhead from this second tower consists of about 1 mol percent of methylacetylene and 90 mol percent of propylene, which is pumped back into the first tower onto a tray with approximately this propylene concentration. In this manner the impurities are eliminated, the propylene meets polymer grade specifications, and a propane product suitable for normal usage is also obtained.

A better understanding of the invention will be gained by referring to the accompanying drawings, wherein FIGURE 1 and FIGURE 2 are simplified schematic flow sheets of two embodiments of the invention.

With reference to FIGURE 1, the feed stream, containing propylene, propane, methylacetylene and propadiene, is fed through line 10 into primary fractionator 12, which for the feed mentioned, has about 180 trays. Fractionator 12 is equipped with the usual auxiliaries including reboiler 14, fed by steam or hot water, an overhead line 15 with a condenser 16 for the overhead fraction, reflux drum 18, pump 20 and reflux line 22. The bottoms product from fractionator 12, in line 24, is primarily propane but also contains the major portion of the propadiene contained in the feed. A propylene product of polymer grade purity is withdrawn in line 26, which is a branch of the reflux stream from reflux pump 20.

Products of the foregoing composition are possible because of the use of sidestream 28, just below the feed level in tower 12, which is passed into fractionating tower 30. As noted above, methylacetylene and propadiene impurities concentrate at about this level in tower 12. Tower 30 which, for the feed noted above, has about 65 trays, is also equipped with a reboiler 32 and condenser 34, reflux drum 36 and reflux pump 38, and is operated in such a manner as to deliver most of the methylacetylene and any propadiene to the bottoms in line 40, which is blended with the bottoms from fractionator 12 in line 24. Most of the propylene with a very small impurity level, is withdrawn as overhead in line 42. As can be seen by reference to FIGURE 1, a portion of the overhead is refluxed to tower 30 in line 44, but what is unnecessary for this service is passed in line 46 back to fractionating tower 12 at a level thereof having approximately the equivalent propylene concentration. Separations in tower 30 do not have to be sharp, since the overhead is returned to tower 12 for finishing, and the quantity of bottoms in line 40 is relatively small, representing only a small overall loss of propylene.

Thus, the process according to the invention takes advantage of the higher concentrations of methylacetylene in the middle of tower 12 by drawing off a stream which is relatively rich in this contaminant. The use of a second tower 30 overcomes the problem of fractionating such mixtures in a single tower and makes such a single tower separation feasible by, in effect, cutting out the middle of the first tower, performing the separation and returning the separated components.

As a typical example of operation in accordance with the above-described embodiment of the invention, there is set forth hereinbelow in Table I the composition of the feed, bottoms and overhead of each tower in accordance with the invention. Under the conditions of operation represented by Table I, in reflux drum 18 the overhead is at 100° F. and 245 p.s.i.g., bottoms in line 24 are at 125° F., overhead in reflux drum 36 is at 100° F. and 225 p.s.i.g., and bottoms in line 40 are delivered at 115° F.

TABLE I (MOL./HR.)

|  | Tower 12 | | | Tower 30 | | |
| --- | --- | --- | --- | --- | --- | --- |
|  | Feed | Bottoms | Overhead | Feed | Bottoms | Overhead |
| Propylene | 49.25 | 0.47 | 48.34 | 2.30 | 0.44 | 1.86 |
| Methylacetylene | 0.50 | 0.19 | 0.00 | 0.33 | 0.31 | 0.02 |
| Propadiene | 1.00 | 0.95 | 0.00 | 0.05 | 0.05 |  |
| Propane | 49.25 | 46.82 | 0.24 | 2.30 | 2.10 | 0.11 |
| Reflux/Product Ratio |  | 24 |  |  | 24 |  |
| Theoretical Trays |  | 180 |  |  | 65 |  |

In certain applications of the invention it will be desired to have the bottom product in line 24 of high purity rather than the overhead in line 26, as discussed above. Such an arrangement is illustrated in FIGURE 2, wherein parts similar to those in FIGURE 1 have the same reference numerals. As can be seen from FIGURE 2, the only difference is the disposition of the net overhead and bottoms from tower 30. In this embodiment, tower 30 is operated so as to produce an overhead containing the major portion of the intermediate impurities and a bottom having only a small amount of such impurities. Bottoms, in line 52, are recycled back to tower 12 at a level having a similar concentration. Net overhead is removed from the system via line 50. Tower 12 is operated so as to produce a bottoms of high purity and the overhead is, of course, less pure. As in FIGURE 1, net overhead is withdrawn in line 26. Again, losses of valuable products are low, but the separation is excellent.

It will be understood that various changes in the details, materials, steps and the arrangements of parts, which have been herein described and illustrated in order to explain the nature of the invention, may be made by those skilled in the art within the principle and scope of the invention as expressed in the appended claims.

What is claimed is:

1. In the separation of propane-propylene mixtures containing acetylenic impurities, an improvement comprising:
   introducing the mixture into a first fractionation zone;
   withdrawing a sidestream containing a substantial portion of said acetylenic impurities from said first fractionation zone;
   introducing the sidestream into a second fractionation zone;
   recovering a propylene overhead stream, containing a major portion of said acetylenic impurities and a propane bottoms stream from said second fractionation zone, said propane bottoms stream containing a minor portion of said impurities;
   recycling at least a portion of said propane bottoms stream to the first fractionation zone; and
   recovering a propane product free of said acetylenic impurities as bottoms and an overhead product containing propylene from said first fractionation zone.

2. Process for the separation of acetylenic impurities from a hydrocarbon stream containing propane and propylene that comprises:
   passing said stream to a first fractionation zone and producing therein a propane product as bottoms and a propylene product as overhead;
   withdrawing a sidestream from said first fractionation zone containing the major portion of said acetylenic impurities;
   passing said sidestream to a second fractionation zone and producing therein a bottoms product containing substantially all of said acetylenic impurities and some propane and an overhead containing propylene;
   recycling at least a portion of the overhead from said second fractionation zone to said first fractionation zone; and
   recovering at least a portion of the overhead from said first fractionation zone as a propylene product essentially free of acetylenic impurities.

3. The process as claimed in claim 2, wherein the overhead from said first and second fractionation zones is condensed and utilized in part as reflux to said respective zones.

4. The process as claimed in claim 2, wherein the bottoms products from said first and second fractionation zones are combined and recovered as a propane-rich product.

5. The process as claimed in claim 2, wherein said sidestream is withdrawn at an intermediate point from said first fractionation zone, said point being in the region of introduction of said stream.

6. Process for the production of polymer-grade propylene from propylene-propane mixtures containing methylacetylene and propadiene impurities that comprises:
   passing said mixture to a first fractionation zone controlled to produce a propane product as bottoms and a propylene product as overhead;
   withdrawing a sidestream from said first fractionation zone at a point of high concentration of said impurities;
   passing said sidestream to a second fractionation zone and producing therein a propane product containing substantially all of said impurities as bottoms and propylene as overhead;
   recycling at least a portion of the overhead from said second fractionation zone to said first fractionation zone;
   recovering at least a portion of said overhead from said first fractionation zone as polymer-grade propylene; and
   recovering the bottoms products of each of said fractionation zones as a propane product.

7. The process as claimed in claim 6, wherein the overhead from said first and second fractionation zones is condensed and utilized in part as reflux to said respective zones.

8. The process as claimed in claim 6, wherein said overhead from said second fractionation zone is recycled to the first said zone at a point wherein the propylene concentration within said zone is about the same as in said recycle stream.

9. In the separation of propylene-propane mixtures containing acetylenic impurities by fractionation in a first fractionating tower, the improvements that comprise:
   withdrawing a sidestream from said first fractionating tower containing a substantial portion of said acetylenic impurities;
   passing said sidestream to a second fractionating tower and producing therein a bottoms product containing the major portion of said impurities and a propylene overhead;
   recycling at least a portion of said propylene overhead to said first tower;
   recovering a propylene product free of said impurities as overhead from said first tower; and
   recovering a propane product containing said impurities as bottoms from each of said towers.

10. The process as claimed in claim 9, wherein said sidestream is withdrawn from said first tower near the point of introduction of said mixture, and said recycled propylene overhead is passed into said first tower at a point where the propylene concentration within said tower is about the same as in said recycle stream.

References Cited

UNITED STATES PATENTS

| | | | |
|---|---|---|---|
| 2,236,966 | 4/1941 | Balthis et al. | 62—28 X |
| 3,002,358 | 10/1961 | Dierl | 62—23 |
| 3,153,679 | 10/1964 | Rottmayr | 62—24 X |
| 3,230,725 | 1/1966 | Baldus | 62—28 |
| 3,313,724 | 4/1967 | Kniel | 62—24 X |

NORMAN YUDKOFF, *Primary Examiner.*

V. W. PRETKA, *Assistant Examiner.*

UNITED STATES PATENT OFFICE
Certificate

Patent No. 3,390,535                                                            Patented July 2, 1968

Louis Marshall

Application having been made by Louis Marshall, the inventor named in the patent above identified; and Lummus Company, New York, New York, a corporation of Delaware, the assignee, and Jules Lerner for the issuance of a certificate under the provisions of Title 35, Section 256, of the United States Code, adding the name of the said Jules Lerner as a joint inventor, and a showing and proof of facts satisfying the requirements of the said section having been submitted, it is this 29th day of July 1969, certified that the name of the said Jules Lerner is hereby added to the said patent as a joint inventor with the said Louis Marshall.

[SEAL]

EDWIN L. REYNOLDS,
*First Assistant Commissioner of Patents.*